United States Patent [19]

Namba et al.

[11] Patent Number: 5,534,577
[45] Date of Patent: Jul. 9, 1996

[54] AQUEOUS POLYOLEFIN RESIN COMPOSITION

[75] Inventors: Hiroaki Namba; Ken-ichi Fujino, both of Iwakuni, Japan

[73] Assignee: Nippon Paper Industries Co., Ltd., Tokyo, Japan

[21] Appl. No.: 166,903

[22] Filed: Dec. 15, 1993

Related U.S. Application Data

[63] Continuation-in-part of Ser. No. 145,090, Nov. 3, 1993, abandoned.

[30] Foreign Application Priority Data

Nov. 11, 1992 [JP] Japan .................................... 4-326118
Mar. 2, 1993 [JP] Japan .................................... 5-064874
Oct. 13, 1993 [JP] Japan .................................... 5-280127

[51] Int. Cl.$^6$ ....................................................... C08K 5/04
[52] U.S. Cl. ........................... 524/377; 524/378; 524/247; 524/249
[58] Field of Search ................................. 524/377, 378, 524/247, 249

[56] References Cited

U.S. PATENT DOCUMENTS 3,523,093  8/1970  Stamberger .

4,855,359  8/1989  Ryntz et al. .

FOREIGN PATENT DOCUMENTS 0472837   3/1992   European Pat. Off. .
2265626   10/1993  United Kingdom .
WO90/12656 11/1990 WIPO .

OTHER PUBLICATIONS

Database WPI, Derwent Publication, AN 91–277161, JP 3–182 534, Aug. 8, 1991.

*Primary Examiner*—Jeffrey T. Smith
*Attorney, Agent, or Firm*—Oblon, Spivak, McClelland, Maier, & Neustadt

[57] ABSTRACT

An aqueous polyolefin resin composition of (a) a polyolefin or a modified polyolefin selected from the group consisting of polyolefins which have been modified by graft copolymerization with an unsaturated carboxylic acid, unsaturated carboxylic acid anhydride or mixture thereof, polyolefins which have been modified by graft copolymerization with a reactive monomer having radical polymerizability and mixtures thereof and (b) a substance with a structure of poly-(alkylene oxide) and a solubility parameter (SP value) of not lower than 7 cal$^{1/2}$·cm$^{-3/2}$ to not higher than 12 cal$^{1/2}$·cm$^{-3/2}$ at a proportion of not less than 0.001 wt. % to not more than 50 wt. % upon aqueous conversion of the polyolefin or modified polyolefin and its use in film forming compositions such as paints, primers, inks and coating materials.

15 Claims, No Drawings

AQUEOUS POLYOLEFIN RESIN COMPOSITION

This application is a Continuation-In-Part of U.S. patent application Ser. No. 08/145,090, filed on Nov. 3, 1993, now abandoned.

BACKGROUND OF THE INVENTION

The present invention relates to an aqueous resin composition, which can be used mainly as a paint, primer, ink, adhesive and sealant. Moreover, the inventive resin composition is possible to be used by formulating to other aqueous resins and water-soluble resins such as aqueous urethane, acrylic, polyester and epoxy depending on the uses, hence it can also be utilized as a modifier of film forming materials.

Above all, since it allows to form a film and adhesive layer excellent in the adhesiveness, flexibility and water resistance particularly onto polyolefin substrate et. having a nonpolar surface, it is useful as a resin for the parts of car etc., paints for polyolefin film, polyolefinic mold, etc., primer, ink, sealant and adhesive.

Conventionally, modified polyolefin compositions modified polyolefins such as polypropylene, polyethylene and copolymer of propylene, ethylene and α-olefin with unsaturated carboxylic acid or acid anhydride and acid-modified chlorinated polyolefins chlorinated them further are used for painting material, primer, ink, etc. In the present circumstances, however, these resins dissolve only into aromatic organic solvents such as toluene and xylene, hence a large quantity of organic solvent cannot help being used, posing the problems from the safety and health and environmental pollution.

For this reason, in recent years, an aqueous resin with aqueous conversion performed by adding polyol, surfactant and basic substance to chlorinated polyolefin (U.S. Pat. No. 340,845 ), an aqueous resin aqueous-converted chlorinated polyolefin acid-modified with unsaturated carboxylic acid or acid anhydride by using surfactant and basic substance (Japanese Patent Application No. Hei 01-323506), and the like are applied.

In addition, attempts to produce aqueous dispersions of chlorinated polyolefin have been made, which are disclosed in, for example, Japanese Unexamined Patent Publication No. Hei 1-153778, No. Hei 1-256556, No. Hei 2-284973 and the like, but these use the aromatic organic solvent on production, thus complete elimination thereof was difficult. Moreover, attempts to produce aqueous dispersions of modified polyolefin have also been made, which are disclosed in, for example, Japanese Unexamined Patent Publication No. Sho 59- 47244, No. Hei 2-286724 and the like. However, in the painting, adhesion, etc., they have drawbacks of low adhesiveness and water resistance, poor paintability, etc., when the coating articles and adhering articles are polyolefin resins, hence such aqueous compositions have not still come to the practical use. Moreover, in Japanese Unexamined Patent Publication No. Hei 3-182534, the improvement in the performance of coated film is intended by performing the aqueous conversion of modified chlorinated polyolefin using surfactant and further by formulating aqueous polyurethane resin.

However, because of the nonreactivity of water-soluble urethane resin and surfactant, the active ingredient dissolves out from coated film by water causing a phenomenon of decreased water resistance due to the defect of coated film that seems to take place through it.

Moreover, when forming the film using aqueous converted chlorinated polyolefin resin with aqueous conversion performed by using polyol and surfactant, the hydrophilic ingredients such as polyol and surfactant are left behind in the film and they dissolve out by moisture resulting in a drawback of low water resistance of film.

Furthermore, since the chlorinated resin ingredient is contained in large quantities, not a few problems arose in the abolition and recycling treatment of final product with film, adhesive layer, etc. formed.

Whereas, the inventors made an application on an aqueous resin aqueous converted polyolefin resin, chlorinated polyolefin-resin or acid-modified polyolefin resin by using a reactive surfactant (Japanese Patent Application No. Hei 04-256935. No. Hei 04-256936 and No. Hei 04- 256937). These inventions aim at the improvement in the water resistance of film by fixing the hydrophilic substances present in the film to film.

The reactive surfactant has been used on emulsion polymerization up to now. It has a surface activity to suspend monomer into water during the emulsion polymerization and, because it reacts with other monomer, it is taken in the structure of polymer bringing an effect on the improvement in the water resistance of reaction product as a result.

However, when comparing with nonreactive surfactant having similar structure thereto, the reactive surfactant has lower dispersibility of resin, hence the addition level had to be made higher or other polyol, nonreactive surfactant, etc. had to be used in combination for obtaining a stable aqueous conversion product.

Aqueous block isocyanates are used generally for fiber processing, crosslinking agent and modifier of resins such as latex, acrylic and urethane, surface processing of plastic film, and the like, but there are no reports that have found novel uses and features by combining them with aqueous polyolefinic resin.

Moreover, when introducing the crosslinking structure by combining with block isocyanate and further fixing the hydrophilic ingredient, too, the use level of block isocyanate was limited to maintain the adhesiveness of formed film to substrate and, in particular, it was needed to decrease the hydrophilic substance having active hydrogen reacting with isocyanate as little as possible to improve the water resistance of film and maintain the adhesiveness to substrate.

On the other hand, the aqueous conversion of polyolefinic resin is generally performed by a method that, after the resin raw material was dissolved into some solvent, hydrophilic ingredients such as surfactant and basic substance are added and then the solvent is substituted by water.

Moreover, a method that the raw material resin, surfactant and basic substance are mixed and molten at a temperature above the melting point of resin and then water is added gradually thereto to cause the phase inversion, thus performing the aqueous conversion. This method however is performed traditionally under ambient pressure, hence, in the case of raw material resin having high viscosity below 100° C. and the like, the addition of water decreased the temperature of resin to increase the viscosity of molten liquor, resulting in decreased stirring efficiency and in capability of homogeneous phase inversion in many cases.

As described above, conventional modified polyolefin compositions were used as solutions in organic solvents, hence the toxicity of solvent, environmental problems, etc. raised a question. Moreover, around the aqueous resin compositions using surfactant, which were contrived in an attempt to solve them, the controversial point of water resistance hung hitherto. The purpose of the invention is to provide an aqueous resin composition simultaneously solvable all of these toxicity, environmental problems and poor water-resistant performance of coated film.

Moreover, the invention aims at the solution of a problem of residual solvent involved in the conventional method of aqueous conversion of polyolefinic resin and a problem of residual undispersed solids causing through the heterogeneous phase inversion as well.

Furthermore, the invention aims at the improvement in the water resistance without injuring the adhesiveness and adhesion of film formed with the aqueous resin composition of polyolefin or modified polyolefin to substrate in the use of said aqueous resin composition.

As a result of diligent investigations on the aqueous resin composition, which has no problems such as toxicity and pollution, thus being excellent in the safety and which is excellent in the water resistance without injuring the adhesiveness and adhesion, to attain said purposes, the inventors have reached the invention.

By using the block isocyanate the isocyanate group of which are blocked and do not react with water, it does not react with water in the steps of aqueous conversion adding water to modified resin and of coating of aqueous resin composition onto substrate and drying, but it is deblocked to have activated isocyanate group when it is subject to the heat treatment further at higher temperature after drying or when it is subject to the heat treatment by baking at a temperature higher than the drying temperature after other film-forming component was overcoated. The activated isocyanate group reacts with surfactant remaining in the film ingredient, modified polyolefin or other hydrophilic groups such as hydroxyl group, carboxyl group and amino group present in the overcoating paint etc. In this way, when using in combination with modified polyolefin resin, an improving effect on the water resistance of film has been found by fixing the hydrophilic ingredient or transforming the hydrophilic functional group into more hydrophobic functional group without injuring the characteristics of polyolefin.

In addition, upon preparation of the aqueous resin composition, it has been found that, by using poly(alkylene oxide) derivatives with a solubility parameter (SP value) of not lower than 7 $cal^{1/2}cm^{-3/2}$ to not higher than 12 $cal^{1/2}cm^{-3/2}$, stable aqueous conversion product can be obtained effectively in less amount over the cases using alcohols, low-molecular weight glycols or other surface-active ingredients. Moreover, when using the surface-active ingredients described in the invention in combination, it has been found that the affinity of aqueous solvent to resin improves, thus the use level of surfactant can be decreased further. Such effects appeared also in the cases of combined use of hydrophilic third ingredients such as other surfactants, alcohols and glycols.

In consequence thereof, the amounts of hydrophilic ingredients and hydrophilic functional groups in the film formed with the aqueous resin prepared could be decreased, thereby remarkably improving the water resistance of film. This effect appeared also in the case of combined use of block isocyanate and it has been found that the water resistance of film can improve even more over the case of using conventional aqueous converted polyolefin resin with aqueous conversion performed by using alcohols, low-molecular weight glycols and surfactants in combination with block isocyanate.

SUMMARY OF THE INVENTION

The invention includes:

An aqueous polyolefin resin composition characterized by containing a substance with a structure of poly(alkylene oxide, and a solubility parameter (SP value) of not lower than 7 $cal^{1/2}cm^{-3/2}$ to not higher than 12 $cal^{1/2}cm^{-3/2}$ at a preparation of not less than 0.001 wt. % to not more than 50 wt. % as a constitutional ingredient upon aqueous conversion of polyolefin or modified polyolefin, and film formers such as paint, primer, ink and coating material, sealant and adhesive containing it as a part of constitutional ingredients;

And, the above aqueous resin composition wherein the modified polyolefin resin is a modified polyolefin comprising one or plural kinds of (A) modified polyolefin characterized by being modified through the graft copolymerization with unsaturated carboxylic acid and/or acid anhydride, (B) modified polyolefin characterized by being modified through the chlorination and (C) modified polyolefin characterized by graft copolymerizing a reactive monomer with radical polymerizability, and film formers such as paint, primer, ink and coating material, sealant and adhesive containing it as a part of constitutional ingredients;

Moreover, an aqueous polyolefin resin composition characterized by containing a substance with a structure of poly(alkylene oxide) and a solubility parameter (SP value) of not lower than 7 $cal^{1/2}cm^{-3/2}$ to not higher than 12 $cal^{1/2}cm^{-3/2}$ at a proportion of not less than 0.001 wt. % to not more than 50 wt. % as a constitutional ingredient upon aqueous conversion of modified polyolefin obtainable through two or more kinds of modifications of acid modification, chlorination modification and reactive monomer modification shown in (A), (B) and (C), respectively, and film formers such as paint, primer, ink and coating material, sealant and adhesive containing it as a part of constitutional ingredients;

Furthermore, an aqueous polyolefin resin composition characterized by containing a substance with a structure of poly(alkylene oxide) and a solubility parameter (SP value) of not lower than 7 $cal^{1/2}cm^{-3/2}$ to not higher than 12 $cal^{1/2}cm^{-3/2}$ at a proportion of not less than 0.001 wt. % to not more than 50 wt. % as a constitutional ingredient and by using a polyolefin and/or a modified polyolefin showing a melt viscosity within a viscosity range of 100 cps to 30000 cps at a temperature range of 60° to 300° C. upon aqueous conversion of polyolefin or modified polyolefin, and film formers such as paint, primer, ink and coating material, sealant and adhesive containing it as a part of constitutional ingredients;

Still more, an aqueous polyolefin resin composition containing a substance with a structure of poly(alkylene oxide), a solubility parameter (SP value) of not lower than 7 $cal^{1/2}cm^{-3/2}$ to not higher than 12 $cal^{1/2}cm^{-3/2}$ and an average molecular weight of 200 to 5000 at a proportion of not less than 0.001 wt. % to not more than 50 wt. % as a constitutional ingredient upon preparation of aqueous polyolefin resin composition obtainable through the aqueous conversion of polyolefin or modified polyolefin, and film formers such as paint, primer, ink and coating material, sealant and adhesive containing it as a part of constitutional ingredients;

Still more, an aqueous resin composition characterized by using polyoxyalkylene diol represented by a general formula 1) as a substance with a structure of poly(alkylene oxide) upon preparation of aqueous polyolefin resin obtainable through the aqueous conversion of polyolefin or modified polyolefin, and film formers such as paint, primer, ink and coating material, sealant and adhesive containing it as a part of constitutional ingredients;

General formula 1)
HO—[(PO)$_n$/(EO)$_m$]—H
E;—CH$_2$CH$_2$—
P;—CH$_2$CH—
         |
        CH$_3$ n, m; An integer of not smaller than 0 to not larger than 100, $4 \leq n+m \leq 100$ / shows a structure of random copolymerization or block copolymerization, but, when either n or m is 0, it shows a strurcture of homopolymer.

Still more, an aqueous resin composition characterized by using ethylene oxide-propylene oxide adduct of aliphatic alcohol represented by a general formula 2) as a substance with a structure of poly(alkylene oxide) upon preparation of aqueous polyolefin resin composition obtainable through the aqueous conversion of polyolefin or modified polyolefin, and film formers such as paint, primer, ink and coating material, sealant and adhesive containing it as a part of constitutional ingredients;

General formula 2)
RO—[(PO)$_m$/(EO)$_n$]—H
R: A group comprising hydrocarbon with carbon atoms of 1 to 50
E;—CH$_2$CH$_2$—
P
—CH$_2$CH—
    |
   CH$_3$ m, n; An integer of not smaller than 0 to not larger than 50, $2 \leq m+n \leq 100$ / shows a structure of random copolymerization or block copolymerization, but, when either n or m is 0, it shows a structure of homopolymer.

Still more, an aqueous resin composition characterized using ethylene oxide-propylene oxide adduct of aliphatic amine represented by a general formula 3) as a substance with a structure of poly(alkylene oxide) upon preparation of aqueous polyolefin resin composition obtainable through the aqueous conversion of polyolefin or modified polyolefin, and film formers such as paint, primer, ink and coating material, sealant and adhesive containing it as a part of constitutional ingredients:

General formula 3)
R—N⟨[(PO)$_m$/(EO)$_n$]—H
      [(PO)$_l$/(EO)$_k$]—H

R: A group comprising hydrocarbon with carbon atoms of 1 to 50
E;—CH$_2$CH$_2$—
P
—CH$_2$CH—
    |
   CH$_3$ m, m; An integer of not smaller than 0 to not larger than 50, $2 \leq m+n \leq 100$ l, k; An integer of not smaller than 0 to not larger than 50, $2 \leq l+k \leq 100$ / shows a random copolymer or block copolymer, but, when either m or n is 0 or when either l or k is 0, it shows a structure of homopolymer.

Still more, an aqueous polyolefin resin composition characterized by using a surfactant ingredient with a structure of polyoxyethylene alkylphenyl ether represented by a general formula 4) in combination with at least one kind of substances represented by the general fromulae 1), 2) and 3) as a substance with other structure of polyoxyalkylene at a proportion of 1 to 200 to 200 to 1 upon preparation of aqueous polyolefin resin composition obtainable through the aqueous conversion of polyolefin or modified polyolefin, and film formers such as paint, primer, ink and coating material, sealant and adhesive containing it as a part of constitutional ingredients;

General formula 4)

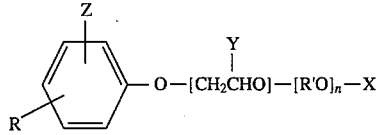

R; A lower alkyl group
R'; —CH$_2$CH$_2$—,
—CH$_2$CH—
    |
   CH$_3$

X; A hydrogen atom, lower alkyl group or nonionic or anionic hydrophilic group
Y; A hydrogen atom or —CH$_2$—O—CH$_2$—CH=CH$_2$
Z; A hydrogen atom or —CH=CH—CH$_3$
However, Y and Z do not have double bond at the same time.

An aqueous polyolefin resin composition and a production method therefor characterized in that, after the raw material resin is molten at an applied pressure of 0.1 to 100 kg/cm$^2$ and the surfactant or alcohols and basic substance are mixed, water is added gradually under stirring to cause the phase inversion, thereby performing the aqueous conversion while coexisting, the resin ingredient, water and other ingredients within a range of not lower than 100° C. to not higher than 300° C. upon aqueous conversion of polyolefin and/or modified polyolefin and are effective;

Moreover, an aqueous resin composition characterized by formulating a block isocyanate to polyolefin and/or modified polyolefin at a proportion by weight of 0.1:1 to 20:1 during aqueous conversion or after aqueous conversion upon preparation of aqueous polyolefin resin composition obtainable through the aqueous conversion of polyolefin or modified polyolefin, and film formers such as paint, primer, ink and coating material, sealant and adhesive containing it as a part of constitutional ingredients;

Still more, a one-component type aqueous polyolefin resin composition characterized by formulating an aqueous block isocyanate with aqueous conversion already performed by some method to aqueous polyolefin resin composition as described above or aqueous polyolefin resin composition other than that at a proportion by weight of 0.1:1 to 20:1, and film formers such as paint, primer, ink and coating material, sealant and adhesive containing it as a part of constitutional ingredients;

Still more, a two-component type aqueous resin composition characterized by formulating a block isocyanate with aqueous conversion performed to aqueous polyolefin resin composition as described above or aqueous polyolefin resin composition other than that at the time of painting, and film formers such as paint, primer, ink and coating material, sealant and adhesive used said two component system which comprises two components; one containing either component as a part of constitutional ingredients and the other containing another component as a constitutional ingredient;

And, finally, the aqueous resin composition of the present invention, wherein a block isocyanate using hexamethylene diisocyanate-based polyisocyanate for raw material is used as a block isocyanate, and film formers such as paint, primer, ink and coating material, sealant and adhesive containing it as a part of constitutional ingredients.

DETAILED DESCRIPTION OF THE INVENTION

In following, the invention will be illustrated in detail.

As the polyolefins to be used in the invention, homopolymer of ethylene or propylene, random copolymer or block copolymer of ethylene or propylene with other comonomer with carbon atoms of two or more, for example, butene-1, pentene-1, hexene-1, heptene-1, octene-1 or the like, preferably $\alpha$-olefin-comonomer with carbon atoms of 2 to 6, or copolymer with two or more kinds of the comonomers is used. The average molecular weight of polyolefin is usually 2000 to 100000. Polyolefin obtained by publicly known methods may be used, but one that degrated polyolefin once synthesized to high molecular weight by radical, oxygen or heat can also be used.

The chlorinated polyolefin is one chlorinated said polyolefin by publicly known methods. The acid-modified polyolefin is a polyolefin modified said polyolefin with $\alpha,\beta$-unsaturated carboxylic acid or acid anhydride thereof through the graft reaction. In addition, a modified polyolefin modified by combining chlorination and acid modification is also used. Moreover, such polyolefin resin that the reactive surfactant was reacted with polyolefinic resin such as acid-modified polyolefin or chlorinated polyolefin using a radical reaction initiator to perform aqueous modification is also used as a raw material for the aqueous conversion.

When forming the film onto a substrate containing polypropylene, the proportion of propylene ingredient is preferable to be not less than 55 mol %. If it is under 55 mol %, the adhesiveness to polypropylene will become poor, which is unpreferable.

As the $\alpha,\beta$-unsaturated carboxylic acids or acid anhydrides thereof to be used for the modification of polyolefin, for example, maleic acid, fumaric acid, itaconic acid, citraconic acid, allylsuccinic acid, mesaconic acid, aconitic acid, their acid anhydrides, etc. can be mentioned. The amount to graft copolymerize $\alpha,\beta$-unsaturated carboxylic acid or acid anhydride thereof is preferable to be 1 to 20 wt. %. If under 1 wt. %, the stability on dispersing into water will become poor and, if over 20 wt. %, the grafting efficiency will become low, which is uneconomical. Particularly preferable is up to 15 wt. %. Moreover, number average molecular weight of resin graft copolymerized $\alpha,\beta$-unsaturated carboxylic acid or acid anhydride thereof is preferable to be 3000 to 40000. If under 3000, the cohesive force will be insufficient resulting in low adhesiveness to polyolefin resin and, if over 40000, the manipulation on dispersing into water will become poor, which is unpreferable. Accommodating the molecular weight within this range is possible by selecting the molecular weight of raw material or the conditions of graft reaction and is also possible by a method that the molecular weight of raw material is once dropped and then graft reaction is conducted. Besides, the number average molecular weight can be determined by means of GPC (gel permeation chromatography).

The method of graft copolymerizing $\alpha,\beta$-unsaturated carboxylic acid or acid anhydride thereof to polyolefin may be performed by the publicly known methods, but it is particularly preferable to perform by a method that the polyolefin is molten by heating above melting point and graft copolymerization is performed in the presence of radical generator.

In the invention, upon preparation of aqueous polyolefin resin composition formulated with polyolefin, modified polyolefin or block isocyanate, basic substance, alcohols, surfactant, reactive surfactant and radical reaction initiator can also be added.

The addition of basic ingredient is because of better dispersion into water through the ionization of hydrophilic groups such as carboxyl group and sulfonic group, but the use thereof is not required in some cases when reactive surfactant and nonreactive surfactant used are already neutralized with base, and the like.

As the bases, sodium hydroxide, potassium hydroxide, ammonia, methylamine, ethylamine, propylamine, butylamine, hexylamine, octylamine, ethanolamine, propanolamine, diethanolamine, N-methyldiethanolamine, dimethylamine, diethylamine; triethylamine, N,N-dimethylethanolamine, 2-dimethylamino-2-methyl-1-propanol, 2-amino- 2-methyl-1-propanol, morpholine, etc. can be exemplified. The degree of hydrophilicity of resin can vary depending on the type of base used, hence appropriate selection is needed according to the conditions.

The amount of basic substance to be used is suitable to be within a range of 0.3 to 1.5 times equivalent weight to carboxyl group of acid-modified polyolefin and preferable is 0.5 to 1.2 times. Moreover, when adding basic substance, it is required in some cases to control the pH value of aqueous resin composition to be prepared in the vicinity of neutrality depending on the stability of block isocyanate formulated.

In the invention, the addition of mono alcohol or polyol being one of alcohols is because of increased affinity of raw material resin to water and this effect allows a decreased use level of surfactant. In addition, it becomes also possible to increase the evaporation velocity of water on forming the film. However, if alcohol remains in resin on forming the film, then it decreases the water resistance of coated film, hence an appropriate amount is required and addition of 4 to 200 parts per 100 parts of raw material resin is preferable. If under 4 parts, the dispersibility into water will become poor and, if over 200 parts, the decrease in water resistance will become remarkable. As mono alcohols, for example, methanol, ethanol, n-propanol, i-propanol, n-butanol, i-butanol, t-butanol, ethylene glycol monoalkyl ether, ethylene glycol monoacetate, propylene glycol monoalkyl ether, propylene glycol monoacetate, etc. are mentioned, and, as polyols, for example, ethylene glycol, diethylene glycol, triethylene glycol, propylene glycol, dipropylene glycol, butane diol, pentane diol, hexane diol, glycerine, polyethylene glycol, etc. are mentioned. Thereamong, highly hydrophilic polyols are desirable.

As the surface-active ingredients with a structure of poly(alkylene oxide) and a solubility parameter (SP value) of not lower than 7 $cal^{1/2}cm^{-3/2}$ to not higher than 12 $cal^{1/2}cm^{-3/2}$ to be used in the invention, polyoxyethylene diol, polyoxypropylene diol, polyoxytetraethylene glycol, copolymer of ethylene oxide with propylene oxide, poly(alkylene oxide) adduct of aliphatic alcohol (polyoxyethylene aliphatic alkyl ether etc.), poly(alkylene oxide) adduct of sec-alcohol (polyoxyethylene sec-alcohol ether etc.), poly(alkylene oxide) adduct of alkylamine, poly(alkylene oxide) adduct of alkylamide, polyoxyalkylene alkylphenyl ether (polyoxyethylene nonylphenyl ether, polyoxyethylene dodecylphenyl ether, etc.), polyoxyalkylene sterol ether, polyoxyalkylene lanolin derivative, oxidized alkylene derivative of alkylphenolformalin condensate, polyoxyalkylene glycerins fatty acid ester (polyoxyethylene glycerine fatty acid ester etc.), polyoxyalkylene sorbitol fatty acid ester (polyoxyethylene sorbitol fatty acid ester etc.), polyoxyalkylene glycol fatty acid ester (polyoxyethylene glycol fatty acid ester etc.), polyoxyalkylene fatty acid amide (polyoxyethylene fatty acid amide etc.), polyoxyalkylene alkylamine (polyoxyethylene alkylamine, ethylene oxide-propylene oxide polymer adduct of alkylalkanolamine, etc.) and the like including the compounds of general formulas 1), 2), 3) and 4) are used. The substance with a structure of poly(alkylene oxide) is a substance with a chemical structure comprising oligomer of polymer produced through the homopolymerization or copolymerization (block copolymerization, random copolymerization, graft copolymerization, etc.) of alkylene oxides such as ethylene oxide and propylene oxide. The average molecular weight is not less than 200 to not more than 5000 and preferable is not less than 300 to not more then 3000. If the molecular weight is under 200, the dispersibility will be low and, no remarkable effect will appear. Also, if the molecular weight is over 5000, the dispersibility of resin will decrease. Moreover, these may be used in combination of two or more kinds. The surface-active ingredient aforementioned is used in amounts of 0.1 to 50 parts per 100 parts of raw material resin for aqueous conversion and preferably 3 to 30 parts are used.

The solubility parameter was calculated from the chemical composition of respective substance by Fedors' method.

The surfactants allowing the combined use with said surface-active ingredients include reactive surfactant and nonreactive surfactant.

The reactive surfactant may be one used generally as a reactive surfactant or reactive emulsifier, but one with alkylphenyl group as a hydrophobic group and polyoxyethylene group as a nonionic hydrophilic group is preferable. For example, poly(ethylene oxide) adduct of alkylpropenylphenol, poly(ethylene oxide) adduct of alkyldipropenylphenol and salts of their sulfates of their sulfates shown in Japanese Unexamined Patent Publication No. Hei 4-53802 and No. Hei 4- 50204 are used. Thereamong, 20 mol, 30 mol or 50 mol ethylene oxide adduct of alkylpropenylphenol and ammonium salt of sulfate of 10 mol or 20 mol ethylene oxide adduct of alkylpropenylphenol are preferable. Moreover, ethylene oxide adduct of 1-alkylphenoxy-3-(2-propenyl)oxypropane- 2-01 or its sulfate is excellent in the dispersability of resin and further the polymerizability is high as well due to its unsaturated double bond, which is preferable. These reactive surfactants can be reacted with rosin raw material for aqueous conversion by publicly known methods using a radical reaction initiator to fix to the resin.

The use level of reactive surfactant is 0.1 to 100 parts per 100 parts of modified polyolefin being raw material resin for aqueous conversion and preferable in 0.1 to 30 parts. The use level can be altered timely depending on the addition level of nonreactive surfactant etc. being other hydrophilic ingredients. When using the reactive surfactant, the reaction initiator is used. This reactive surfactant may be reacted beforehand with raw material for aqueous conversion or it may be added during the aqueous conversion process. As the reaction initiators, publicly known ones can be used.

As the nonreactive surfactants, nonionic type surfactants such as propylene glycol ester, sucrose ester, sorbitan alkyl ester, sorbitan fatty acid aster, polyglycerine ester, fatty acid alkanolamide, fatty acid monoglyceride and alkylamine oxide, anionic type surfactants exemplificable by alkyl sulfate, alkylphenol sulfonate, sulfosuccinate as well as carboxylate, phosphate, etc., ampholytic surfactants such as alkylbetaine and alkylimidazolin, and the like and the mixtures of two or more kinds of these can be used.

The addition level of surface-active ingredient combined nonreactive surfactant with reactive surfactant is 1 to 100 parts per 100 parts of modified polyolefin and the necessary level can vary depending on the combination and amount ratio of surface-active ingredients, addition level of alcohol ingredient and the type and amount of reactive monomer.

Said surface-active ingredient can be molten and mixed with raw material resin, but it may be added after mixed part of or overall addition level with water.

As the reactive monomers to be used in the invention, acrylic monomers such as acrylic acid, methacrylic acid, methyl acrylate, butyl acrylate, 2-ethylhexyl acrylate, methyl methacrylate, acrylonitrile, acrylamide and hydroxyethyl acrylate, conjugated diene monomers such as butadiene, isoprene and chloroprene, halogenated olefin monomers such as vinyl chloride and vinylidene chloride, aromatic monomers such as styrene and divinylbenzene, vinyl ester monomers such as vinyl acetate, methyl maleate, maleic anhydride, etc. can be mentioned.

The reaction initiators to initiate the reaction of reactive monomer and reactive surfactant may be publicly known ones and both water-soluble initiators and oil soluble initiators such as azobisisobutyronitrile, hydrogen peroxide and potassium persulfate can be used. In addition, redox type initiators can also be used. Moreover, they may be used in combination.

As the organic peroxides, for example, benzoyl peroxide, dicumyl peroxide, lauroyl peroxide, 2,5-dimethyl- 2,5-di-(t-butylperoxy)-hexine-3,di-t-butyl peroxide, t-butyl hydroperoxide, t-butylperoxybenzoate, cumene hydroperoxide, etc. are mentioned and they are selected to use depending on the reaction temperature and reaction time.

The aqueous block isocyanate compound in the invention means one such that it has isocyanate group in the molecular structure thereof, the isocyanate group is blocked with suitable blocking agent, and it has water solubility or water dispersibility by itself or, even if it may have no water solubility or water dispersibility by itself, it is aqueous convertible by some method such as addition of surfactant or formation of hydrophilic protective colloic.

The block isocyanate is an isocyanate compound blocked polyisocyanate with two or more functions obtainable through the addition reaction or addition polymerization reaction between isocyanate compound with two or more isocyanate groups in one molecule, for example, isocyanate such as ethylene diisocyanate, propylene diisocyanate, tetramethylene diisocyanate, hexamethylene diisocyanate, decamethylene diisocyanate, m-phenylene diisocyanate, p-phenylene diisocyanate, 2,4-tolylene diisocyanate, 2,6-tolylene diisocyanate, 1,5-naphthylene diisocyanate, 4,4',4"-triphenylmethane triisocyanate, 4,4'-diphenylmethane diisocyanate, 3,3'-dimethyl-4,4'-diphenylene diisocyanate, m-xylylene diisocyanate, p-xylylene diisocyanate, isophorone diisocyanate or lysine isocyanate and excess of said isocyanate compound and low-molecular polyol, for example, ethylene glycol, propylene glycol, 1,3-butylene glycol, neopentyl glycol, 2,2,4-trimethyl-1,3-pentane diol, hexamethylene glycol, cychohexane dimethanol, trimethylolpropane, hexane triol, glycerine, pentaerythritol or the like, polyisocyanate with buret structure, polyisocyanate with allophanate linkage, isocyanate with isocyanurate structure, or the like with blocking agent. Said blocking agents include phenol types such as phenol and cresol, alcohol types such as methanol, benzyl alcohol and ethylene glycol monomethyl ether, active methylene types such as methyl acetoacetate and dimethyl malonate, acid amide types such as acetanilide and acetomide and, besides these, imide type, amine type, imidazole type, urea type, carbkamate type, imine type, oxime type, mercapton type, sulfite type, lactam type, and the like. In other words, the block isocyanates referred to so in the invention include compounds generally called block isocyanate, masked isocyanate and reactive urethane or those similar thereto. The proportion of block isocyanate compound to modified polyolefin is within a range of 1:20 to 10:1.

As for the content of isocyanate groups contained in the block isocyanate compound and the amount of functional groups reacting with isocyanate groups such as hydroxyl group and carboxyl group to be contained in the ingredients left behind in the coated film after drying treatment such as modified polyolefin and surface-active ingredient, the optimum proportion can be determined through the reaction rate of block isocyanate under respective deblocking conditions (temperature, time, etc.) of block isocyanate.

When using the block isocyanate, the dissociation of said blocking agent after the evaporation of moisture in the drying process in effective, hence the dissociation temperature of blocking agent is preferable to be higher than the set temperature in the drying process.

Said block isocyanate may be water-dispersible or water-soluble, or it may not be aqueous converted.

Moreover, in the aqueous resin composition of the invention, a catalyst can be used, if need be, to promote the deblocking reaction and the reaction of activated isocyanate group with other active hydrogen.

As the catalysts, dibutyl tin laurate, dibutyl tin fatty acid salt, dibutyl tin diacetate, tetra-n-utyl-1,3-diacetoxydistannoxane, tetra-n-butyl-1,3-dilauryloxydistannoxane, di-n-butyl tin oxide, mono-n-butyl tin oxide, stannous octylate, etc. can be exemplified.

In the invention, in the process of adding and formulating the block isocyanate to modified polyolefin resin, the aqueous conversion may be performed in a way that the modified polyolefin resin is dissolved into a solvent and, after added the block isocyanate compound to this solution, solvent is substituted with water, or the modified polyolefin resin after aqueous conversion may be formulated to aqueous block isocyanate compound for use.

In the case of aqueous resin composition with block isocyanate used, it is coated onto a substrate by some method and, after dried once at a temperature lower than the deblocking temperature to remove moisture, it is treated further at higher deblocking temperature, thereby isocyanate is activated to progress the reaction. When using the aqueous polyolefin resin composition containing the block isocyanate to form the film of the invention, the heat treatment is performed for 1 minute to 2 hours at 60° to 200° C. to deblock and to progress the reaction between isocyanate end other active hydrogen after dried to remove moisture. As for these treatment conditions, the optimum values can be set depending on the deblocking conditions of block isocyanate used and the type and addition level of deblocking catalyst.

The aqueous resin composition of the invention can also be produced by publicly known aqueous conversion methods of polyolefin resin such as aqueous conversion method through solvent substitution and emulsification method through phase inversion at ambient pressure.

As the methods to add the surface-active ingredient to raw material resin for the aqueous conversion, there are a method to add the surface-active ingredient to molten raw material resin under stirring and a method to obtain a mixture by dissolving both ingredients respectively into an organic solvent dissolvable them and then removing the organic solvent by distillation under reduced pressure, etc. The mixture is molten and water is added gradually under stirring to cause the phase inversion, thus to disperse the resin into water. Upon adding water, it is also possible to dissolve part of or overall amount of surface-active ingredient into water to be used beforehand to perform the aqueous conversion.

Moreover, in the aqueous conversion process of acid-modified polyolefin etc., it is possible to control the dispersibility of resin into water by adding the basic substance to neutralize resin and ionize hydrophilic groups. Furthermore, it is also possible to control the pH value of aqueous conversion product by adding the basic substance. This basic substance can be added during stirring of molten resin or can be added to aqueous conversion product.

In the invention, a new method has been found further on the aqueous conversion method improving the drawbacks of conventional methods.

Namely, this is an aqueous conversion method characterized in that, upon aqueous conversion of polyolefin and/or modified polyolefin, a raw material mixture being a mixture of raw material resin with other raw materials for aqueous conversion (other hydrophilic ingredients such as surfactant and basic substance) is mixed above the softening temperature of raw material mixture and below the decomposition temperature thereof and water is added gradually to the molten raw material mixture while stirring further, thereby causing the phase inversion at high temperature.

Here, for keeping water added at high temperature higher than the softening temperature of raw material mixture liquid, it becomes necessary to increase the inner pressure of reaction device. Namely, by applying the pressure to keep water liquid at a temperature set as a condition for aqueous conversion, liquid water and raw material mixture can coexist at the set temperature allowing homogeneous phase inversion.

The temperature for aqueous conversion to be used here is above the softening point of raw material mixture and below the thermal decomposition point thereof, but preferable is not lower than 100° C. to not higher than 300° C. and more preferable is not lower than 110° C. to not higher than 250° C. The pressure to be applied is 0.1 to 100 kg/cm², preferably 0.5 to 50 kg/cm².

Upon preparing the raw material mixture, it may be heated, molten and mixed at ambient pressure or may be molten and mixed under said conditions. Upon adding water, high-temperature and high-pressure water set as the reaction conditions for aqueous conversion may be added gradually to the system or water heated at ambient pressure may be added gradually to the system.

As the reaction device for aqueous conversion, a pressure reaction device equipped with stirrer corresponding to the conditions for aqueous conversion has only to be used, but, under the conditions of higher temperature and higher pressure, pressurized high-temperature extruder etc. can also be used.

The inventive resin composition dispersed into water in this way is not only excellent in the adhesiveness to polyolefin and excellent as a primer on painting and adhesion, but also applicable as a vehicle resin of aqueous paint, aqueous adhesive, binder resin of aqueous ink and aqueous coating material. Further, in the inventive aqueous resin composition, 0.01 to 15 parts of drying-promoting ingredient such as alcohol are added for use, if need be, to improve the evaporation velocity of moisture on drying. Besides this, various additives such as pigments including rust-preventive pigment, coloring pigment and extending pigment, thixotropic agent, viscosity modifier, fluidizing aid, surface modifier, primary antirust agen, defoamer, antiseptic and antimold are added and mixed in necessary amount for use.

Moreover, other aqueous resins, for example, aqueous urethane resin, aqueous epoxy resin, aqueous acrylic resin, aqueous phenolic resin, aqueous amino resin, aqueous polybutadiene resin, aqueous alkyd resin, aqueous chlorinated rubber, aqueous silicone resin, etc. are also blended for use.

In the case of aqueous resin composition with block isocyanate used, it is coated onto a substrate by some method and, after dried once at a temperature lower than the deblocking temperature to remove moisture, it is treated further at higher deblocking temperature, thereby isocyanate is activated to progress the reaction. When using the aqueous resin composition to form the film of the invention, the heat treatment is performed for 1 minute to 2 hours at 60° to 200 ° C. to deblock and progress the reaction between isocyanate and other active hydrogen after dried to remove moisture. As for these treatment conditions, the optimum values can be set depending on the deblocking conditions of block isocyanate used and the type and addition level of deblocking catalyst.

In following, the invention will be illustrated in more detail based on the examples, but the invention is not confined to these.

Trial Production Example 1

In a four-neck flask equipped with stirrer, cooling tube, thermometer and dropping funnel, 300 g of propylene-α-olefin copolymer (propylene component 75 mol %, ethylene component 20 mol % and 1-butene component 5 mol %, number average molecular weight 25,000) were dissolved into 700 g of toluene under heat, then, while keeping the temperature of system at 115° C. under stirring, 13 g of maleic anhydride and 12 g of di-t-butyl peroxide as a radical generator were added dropwise respectively over 2 hours and thereafter aging was performed for 3 hours. After the reaction, the reaction product was cooled to room temperature and then it was thrown into 20 L of acetone for purification to obtain a maleic anhydride graft copolymer with a grafting rate of 2.1 wt. % (average molecular weight 18500).

For the determination of average molecular weight, column TSK-GEL was attached to HPLC-8020 made by Tosoh Corp. and, after the sample was dissolved into THF (tetrahydrofuran), measurement was made at 40° C. The molecular weight was determined from the calibration curve prepared with polystyrene standard sample.

Trial Production Example 2

In a four-neck flask equipped with stirrer, cooling tube, thermometer and dropping funnel, 300 g of propylenebutene-ethylene copolymer(propylene component 68 mol %, butane component 24 mol % and ethylene component 8 mol %, number average molecular weight 68000) were molten under heat, then, while keeping the temperature of system at 180° C. under stirring, 40 g of maleic anhydride and 5 g of dicumyl peroxide as a radical generator were added dropwise respectively over 3 hours and thereafter reaction was conducted for 3 hours. After the reaction, the reaction product was cooled to room temperature and then it was thrown into 20 L of acetone for purification to obtain a maleic anhydride graft copolymer with a grafting rate of 6.2 wt. %. The number average molecular weight determined by means of GPC was 26000.

Trial Production Example 3

Into a reactor equipped with reflux tube were charged 200 parts of acid-modified polyolefin resin obtained in Trial production example 2 and 1000 parts of carbon tetrachloride. After dissolved homogeneously at 65° to 70° C., the internal air was purged with nitrogen gas and chlorine was blown into the reaction liquor at a proportion of 20 parts per 1 hour until the chlorination degree reached 25% for chlorination reaction. After the reaction, carbon tetrachloride was replaced with toluene and simultaneously remaining chlorine was removed at ambient pressure to obtain toluene solution of acid-modified chlorinated polyolefin. Toluene was distilled off from the toluene solution under reduced pressure to obtain an acid-modified chlorinated polyolefin.

Trial Production Example 4

In the same reactor as used in Trial production example 1, 100 parts of unmodified amorphous polyolefin used in Trial production example 2 were dissolved into toluene and 15 g of di-t-butyl peroxide as a radical generator were added dropwise at 80° C. under stirring. Thereafter, toluene was distilled off under reduced pressure to produce a degraded amorphous polyolefin with a molecular weight of 24000.

Example 1

Into a reactor equipped with stirrer, thermometer, cooling tube and dropping funnel were charged 100 parts of modified polyolefin obtained in Trial production example 1. After molten at 120° C. under heat, 6 parts of morpholine as a basic substance were added under stirring and further 40 parts of poly(ethylene oxide) as a surface-active ingredient were added. After stirring until becoming homogeneous mixture, 600 parts of water were added little by little to obtain an aqueous conversion product by phase inversion method. After adjusted the pH value of aqueous conversion product to 6 to 8, the aggregates with a particle diameter of larger than 100 μ were removed further by filtration to obtain an aqueous resin composition (solids 16%). The aggregates were dried for 24 hours at 130° C. to measure the weight. The amount of aggregates was 4.7% based on raw material resin.

Examples 2 through 20

Replacing the surface-active ingredient end basic substance according to the recipes shown in Tables 1 and 2, the aqueous conversion was performed by the similar method to Example 1 to obtain aqueous resin compositions and, at the same time, to measure the amount of aggregates generated.

Example 21

To corresponding amount to 100 parts of solids of aqueous polyolefin resin obtained in Example 1 was added a corresponding amount to 100 parts of solids of aqueous converted block isocyanate (Duranate X-1118, made by Asahi Chemical Industry Co.) under stirring and further the water content was adjusted to obtain an aqueous resin composition with solids of 20%.

Examples 22 through 26

Similarly to Example 21, various block isocyanates were formulated with formulation ratios shown in Table 3 to obtain aqueous resin compositions.

Example 27

Into a pressure reactor equipped with stirrer, thermometer, cooling tube and dropping funnel were charged 100 parts of modified polyolefin obtained in Trial production example 1. After molten at 120° C. under heat, 6 parts morpholine as a basic substance were added under stirring and further 40 parts of poly(ethylene oxide) as a surface-active ingredient were added. After stirring until becoming homogeneous mixture, the reaction system was closely sealed and pressurized to a gauge pressure of 2 atm with nitrogen gas. Then, 600 parts of warm water of 90° C. were added little by little under stirring to obtain an aqueous conversion product by phase inversion method. When adding warm water, the temperature inside the system was kept at 110° to 120° C. The aqueous conversion product was cooled to 40° C. and pressure was relieved. After adjusted the pH value to 6 to 8, the aggregates with a particle diameter of larger than 100 μ were removed further by filtration to obtain an aqueous resin composition (solids 16%). The aggregates were dried for 24 hours at 130° C. to measure the weight. The amount of aggregates was less then 0.05 wt. % based on raw material resin.

Example 28

Into a pressure reactor equipped with stirrer, thermometer, cooling tube and dropping funnel were charged 100 parts of modified polyolefin obtained in Trial production example 2. After molten at 120° C. under heat, 10 parts of diethylamine as a basic substance were added under stirring and further 20 parts of ethylene oxide-propylene oxide adduct of laurylamine as a surface-active ingredient were added. After stirring until becoming homogeneous mixture, the reaction system was closely sealed and pressurized to a gauge pressure of 15 atm with nitrogen gas. Then, 600 parts of warm water of 90° C. were added little by little under stirring to obtain an aqueous conversion product by phase inversion method. When adding warm water, the temperature inside the system was kept at 180° to 190° C. After the completion of warm water addition, the system was kept for 1 hour under stirring. The aqueous conversion product was cooled to 40° C. and pressure was relieved. After adjusted the pH value to 6 to 8, the aggregates with a particle diameter of larger than 100 μ were removed further by filtration to obtain an aqueous resin composition (solids 16%). The aggregates were dried for 24 hours at 130° C. to measure the weight. The amount of aggregates was less than 0.05 wt. % based on raw material resin.

Example 29

In a four-neck flask similar to Trial production example 1, 100 g of maleic anhydride graft copolymer obtained in Trial production example 1 were molten at 120° C. under heat and, after added 10 g of ethylene glycol and 15 g of morpholine, 10 g of 10 mol ethylene oxide adduct of 1-alkylphenoxy-3-(2-propenyl)oxypropane-2-ol (Adeka Reasoap NE- 10, made by Asahi Denka Kogyo K.K.), temperature was lowered to 110° C. and water of 90° C. was added gradually to prepare an aqueous reaction liquor. Thereto were added 10 g of sodium persulfate being a radical reaction initiator and the reaction was conducted for 4 hours at 80° C. under stirring, thus performing the polymerization reaction. After the reaction, 4 g of triethylamine were added to obtain an aqueous converted reaction liquor (solids 30%). After treated for 48 hours with ultrafiltration membrane with a fractional molecular weight of 5000, the aqueous converted reaction liquor was concentrated again to obtain an aqueous acid-modified polyolefin resin with solids of 45%. The aqueous acid-modified polyolefin resin thus obtained and an aqueous block isocyanate (Elastoron BN-69, made by Dai-ichi Kogyo Seiyaku Co.) were mixed at solids of 2:1 to obtain an aqueous resin composition.

Example 30

In a four-neck flask similar to Trial production example 1, 100 g of maleic anhydride graft copolymer obtained in Trial production example 2 were dissolved into 200 g of toluene at 110° C. under heat and, after added 10 g of t-butylperoxyisopropyl carbonate and 9.6 g of morpholine, toluene (120 g) solution of 10 g of 20 mol ethylene oxide adduct of alkylpropenylphenol (Aquaron RN-20, made by Dai-ichi Kogyo Seiyaku Co.) was added dropwise over 3 hours and then post-reaction was conducted for 4 hours, thus performing the graft copolymerization. After distilled off toluene contained in reaction liquor under reduced pressure, 4 g of triethylamine and 20 g of propylene glycol monomethyl ether were added and water was added under stirring to obtain an aqueous converted reaction liquor (solids 25%). After treated for 48 hours with ultrafiltration membrane with a fractional molecular weight of 5000, the aqueous converted reaction liquor was concentrated again to obtain an aqueous acid-modified polyolefin resin with solids of 40%. To this aqueous acid-modified polyolefin resin. aqueous block isocyanate (Elastoron BN-08, made by Dai-ichi Kogyo Seiyaku Co.) was added at a proportion of solids of 2:1 to obtain an aqueous resin composition.

Example 31

In a four-neck flask similar to Trial production example 1, 100 g of maleic anhydride graft copolymer obtained in Trial production example 2 were molten at 110° C. under heat and, after added 40 g of ethanol, 5 g of poly(ethylane oxide) nonylphenyl ether (NS-212, made by Nippon Oil and Fats Co.) and 9.6 g of morpholine, temperature was kept at 100° C. and water of 90° C. was added under stirring to obtain an aqueous acid-modified polyolefin resin composition (solids 45%). To this aqueous modified polyolefin resin, aqueous block isocyanate (Colonate 2507W. made by Nippon Polyurethane Industry Co.) was formulated at a proportion of solids of 4:3 to obtain an aqueous resin composition.

Example 32

After 500 g of Superclone 803MW (made by Nippon Paper Industries Co., Ltd., chlorine content 59.5%, solids 20 wt. %. toluene solution) being a chlorinated polypropylene resin were heated to 110° C. and; 9.6 g of morpholine were added, 5 g of poly(ethylene oxide) nonylphenyl ether (NS-212, made by Nippon Oil and Fats Co.) were added. After distilled off toluene under reduced pressure, 20 g of ethylene glycol were added and water was added at 100° C. under stirring to obtain an aqueous resin composition (solids 40%). The aqueous chlorinated polyolefin resin thus obtained end an aqueous block isocyanate (Elastoron BN-44, made by Dai-ichi Kogyo Seiyaku Co. ) were mixed at solids of 2:1 to obtain an aqueous resin composition.

Example 33

Into 200 g of toluene were dissolved 100 g of acid-modified polyolefin resin obtained using low-viscosity acid-modified polyolefin resin (MW=12000, grafting rate 9.6 wt. %) obtained by replacing the raw material polyolefin to be used in Trial production example 2 with oxidizingly degrated polyolefin (MW=30000) at 60° C. and after added 50 g of TDI-based block isocyanate (Desmodule BL-1100, made by Sumitomo Bayer Urethane Co.), 5 g of poly(ethylene oxide) nonylphenyl ether (NS-212, Nippon Oil and Fats Co.) were added. After distilled off toluene under reduced pressure, 20 g of ethylene glycol were added and water was added at 100° C. under stirring to obtain an aqueous resin composition (solids 40%).

Comparative Examples 1 through 7

Replacing the surface-active ingredient according to the recipes shown in Table 1, the aqueous conversion was performed by the similar method to Example 1 to obtain aqueous resin compositions and, at the same time, to measure the amounts of aggregates generated.

Comparative Example 8 through 12

Similarly to Example 21, the aqueous converted products obtained in Comparative examples 1, 3, 5, 6 and 7 were formulated to clock isocyanate, respectively, with formulation ratios shown in Table 2 to obtain aqueous resin compositions.

Comparative Example 13

In a four-neck flask similar to Trial production example 1, 100 g of maleic anhydride graft copolymer obtained in Trial production example 2 were molten at 110° C. under heat and, after added 9.6 g of morpholine, 15 g of poly(ethylene oxide) nonylphenyl ether (NS-212, Nippon Oil and Fats Co.) were added. Then, water was added under stirring to obtain an aqueous resin composition (solids 40%).

Comparative Example 14

After 500 g of Superclone 803MW (made by Nippon Paper Industries Co., Ltd., chlorine content 29.5%, solids 20 wt. %, toluene solution) being a chlorinated polypropylene resin were heated to 110° C. and 9.6 g of morpholine were added, 15 g of ethylene oxide) nonylphenyl ether (NS-212, made by Nippon Oil and Fats Co.) were added. After distilled off toluene under reduced pressure, water was added at 100° C. under stirring to obtain an aqueous resin composition (solids 40%).

Comparative Examples 15 and 16

To 100 g of solids of aqueous acid-modified polyolefin resins prepared in Examples 29 and 30, a predetermined amount of Superflex 110 (made by Dai-ichi Kogyo Seiyaku Co.) being a nonionic ester-type aqueous urethane resin was added in place of aqueous block isocyanate and then water was added under stirring to obtain aqueous resin compositions with solids of 45%.

The stability test results, moisture resistance test results and adhesiveness test results of aqueous dispersions of Examples 1 through 20 and Comparative examples 1 through 7 after allowed to stand for 1 month are shown in Table 4.

The moisture resistance test results, adhesiveness test results, gasoline resistance test results, warm water resistance test results and flexing resistance test results of aqueous dispersions of Examples 21 through 26 and Comparative examples 8 through 12 are shown in Table 5. Besides the testing methods are as follows:

The aqueous resin compositions prepared in Examples 1 through 26 and Comparative examples 1 through 12 were spray coated onto a polypropylene plate and dried for 15 to 20 minutes at 80° C. The film thickness was adjusted to 10 to 15 μm. Following this, two-component urethane-based upper coating paint was coated and allowed to stand for 10 minutes at room temperature. Then, after the heat treatment for 2 to 15 minutes at 120° to 130° C. in a fan dryer, forced drying was carried out for 30 minutes at 80° C. The painted plate thus obtained was allowed to stand for 1 day at room temperature to test the coated film.

Adhesiveness Test

Incisions reaching the base were made on the surface of coated film with cutter to produce 100 quadrille sections at intervals of 1 mm. Cellophane adhesive tapes were closely adhered thereon and peeled off five times in the direction of 180 degree to count the number of remaining quadrille sections.

Gasoline Resistance Test

Incisions reaching the base were made on the surface of coated film with cutter end, after immersed into gasoline (lead-free high octane gasoline, made by Nippon Oil Co.) for 4 hours, the state of coated film was observed visually.

Moisture Resistance Test

After immersed one fifth of painted plate into warm water of 50° C. for 240 hours, the state of coated film such as generation of blisters was examined and then cellophane adhesive tapes were closely adhered thereon, which were peeled off five times in the direction of 180 degree to compare the amount of remaining coated film.

Warm Water Resistance Test

After immersed the painted plate into warm water of 40° C. for 240 hours, the state of coated film such as generation of blisters was examined and then cellophane adhesive tapes were closely adhered thereon, which were peeled off five times in the direction of 180 degree to compare the amount of remaining coated film.

Flexing Resistance Test

The painted plate was bent at 180 degrees with 1 in. $\phi$ mandrel to examine the state of coated film.

Storage Stability Test

Sample of aqueoue resin composition prepared (solids 25%) was placed in a glass vessel with a volume of 250 ml and the changes in degree of separation of aqueous phase from emulsion phase and degree of formation of res,in aggregates were compared overtime at room temperature.

The stability test results, adhesiveness test results, gasoline resistance test results, water resistance test results and flexing resistance test results of aqueous dispersions of Examples 29 through 33 and Comparative examples 13 through 16 after allowed to stand for 1 month are shown in table 6. Besides, the testing methods are same as above.

TABLE 1

| | Raw material resin | | Surface-active ingredient | | | | | | |
|---|---|---|---|---|---|---|---|---|---|
| | | Amount (parts) | Type | Amount (parts) | SP Value | M. W. | Type | Amount (parts) | SP Value | M. W. |

| No. of Example | | | | | | | | | | |
|---|---|---|---|---|---|---|---|---|---|---|
| 1 | Trial prod. example 1 | 100 | A | 40 | 10.1 | 1000 | — | — | — | — |
| 2 | Trial prod. example 1 | " | A | 30 | 10.8 | 500 | $C_1$ | 5 | 9.7 | 660 |
| 3 | Trial prod. example 1 | " | A | 15 | " | " | " | 10 | " | " |
| 4 | Trial prod. example 1 | " | B | 30 | " | 400 | — | — | — | — |
| 5 | Trial prod. example 1 | " | B | 10 | " | " | $C_2$ | 5 | 9.7 | 600 |
| 6 | Trial prod. example 1 | " | B | 5 | " | " | " | 10 | " | " |
| 7 | Trial prod. example 1 | " | B | 20 | 9.7 | 1000 | " | 5 | " | " |
| 8 | Trial prod. example 1 | " | B | 15 | " | " | " | 10 | " | " |
| 9 | Trial prod. example 2 | " | D | 10 | 8.8 | 1400 | — | — | — | — |
| 10 | Trial prod. example 2 | " | D | 20 | " | " | — | — | — | — |
| 11 | Trial prod. example 2 | " | D | 5 | " | " | $C_2$ | 5 | 9.7 | 600 |
| 12 | Trial prod. example 2 | " | D | 5 | " | " | E | " | 8.9 | 1250 |
| 13 | Trial prod. example 2 | " | E | 10 | 8.9 | 1250 | $C_2$ | " | 9.7 | 600 |
| 14 | Trial prod. example 2 | " | E | 5 | " | 1300 | $C_1$ | " | " | 660 |
| 15 | Trial prod. example 2 | " | F | 5 | 8.8 | 1350 | " | " | " | " |
| 16 | Trial prod. example 2 | " | $C_2$ | 35 | 9.7 | 600 | — | — | — | — |
| 17 | Trial prod. example 3 | " | B | 10 | 10.8 | 400 | D | 10 | 8.8 | 1400 |
| 18 | Trial prod. example 3 | " | D | 5 | 8.8 | 1400 | E | 5 | 8.9 | 1250 |
| 19 | Trial prod. example 4 | " | D | 10 | " | " | " | 10 | " | 1250 |
| 20 | Chlorinated Polypropylene[1] | " | B | 10 | 10.8 | 400 | D | " | 9.8 | 1400 |

| No. of comp. example | | | | | | | | | | |
|---|---|---|---|---|---|---|---|---|---|---|
| 1 | Trial prod. example 1 | " | H | 30 | 17.8 | — | — | — | — | — |
| 2 | Trial prod. example 1 | " | I | 60 | 15.8 | — | — | — | — | — |
| 3 | Trial prod. | " | J | 60 | 15.9 | — | — | — | — | — |

TABLE 1-continued

| | Raw material resin | | Surface-active ingredient | | | | | | | |
|---|---|---|---|---|---|---|---|---|---|---|
| | | Amount (parts) | Type | Amount (parts) | SP Value | M. W. | Type | Amount (parts) | SP Value | M. W. |
| 4 | Trial prod. example 2 | " | K | 60 | 13.5 | — | — | — | — | — |
| 5 | Trial prod. example 2 | " | H | 30 | 17.8 | — | L | 18 | — | — |
| 6 | Trial prod. example 2 | " | $C_1$ | 5 | 9.7 | 660 | M | 40 | — | — |
| 7 | Trial prod. example 2 | " | $C_1$ | 10 | " | " | H | 18 | — | — |

TABLE 2

| | Surface-active ingredient | | | | Base | | Aggregates and filtration residue |
|---|---|---|---|---|---|---|---|
| | Type | Amount (parts) | SP Value | M. W. | Type | Amount (parts) | Amount (% based on raw material resin |
| No. of example | | | | | | | |
| 1 | — | — | — | — | Morpholine | 6 | 4.7 |
| 2 | — | — | — | — | " | " | 3.1 |
| 3 | — | — | — | — | Monoethanolamine | 3 | 2.0 |
| 4 | — | — | — | — | " | " | 4.0 |
| 5 | — | — | — | — | " | " | 1.2 |
| 6 | — | — | — | — | Morpholine | 4 | 0.1 |
| 7 | — | — | — | — | " | " | 1.7 |
| 8 | — | — | — | — | " | " | 0.7 |
| 9 | — | — | — | — | " | 8 | 1.0 |
| 10 | — | — | — | — | " | " | 0.0 |
| 11 | — | — | — | — | " | " | " |
| 12 | — | — | — | — | Monethanolamine | 4 | " |
| 13 | — | — | — | — | " | " | 0.2 |
| 14 | F | 5 | 8.8 | 1350 | Diethanolamine | 10 | 0.0 |
| 15 | G | 3 | " | 1300 | " | " | " |
| 16 | — | — | — | — | Diethylamine | " | 2.8 |
| 17 | — | — | — | — | Propylamine | 15 | 0.1 |
| 18 | — | — | — | — | " | " | 0.8 |
| 19 | — | — | — | — | Morpholine | 8 | 0.2 |
| 20 | — | — | — | — | " | 4 | 0.0 |
| No. of comp. example | | | | | | | |
| 1 | — | — | — | — | Morpholine | 4 | 75.0 |
| 2 | — | — | — | — | " | " | 53.4 |
| 3 | — | — | — | — | " | " | 48.8 |
| 4 | — | — | — | — | Diethylamine | 10 | 61.1 |
| 5 | — | — | — | — | Morpholine | " | 68.3 |
| 6 | — | — | — | — | " | 9.6 | 8.2 |
| 7 | — | — | — | — | " | " | 10.3 | the symbols in Table 1 and Table 2 above represent followings:
A: Poly (ethylene oxide)
B: Poly (propylene oxide)
$C_1$: Dodecylphenol-ethylene oxide 10 mol adduct
$C_2$: Nonylphenol-ethylene oxide 8.5 mol adduct
D: Coconut oil amine-ethylene oxide propylene oxide 16 mol adduct (block copolymerization type)
E: Lauryl alcohol-ethylene oxide-propylene oxide adduct (block copolymerization type)
F: Laurylamine-ethylene oxide-propylene oxide adduct (block copolymerization type)
G: Myristylamine-ethylene oxide-propylene oxide adduct (random copolymerization type)
H: Ethylene glycol
I: Diethylene glycol
J: Trimethylolpropane
K: 1,6 Hexamethylene diol
L: Nonylbenzene sulfonic acid
M: Ethanol
[1])Chlorinated polypropylene chlorination degree 67% (Trade name Superclone 406, made by Nippon Paper Industries Co., Ltd.)

A unit of the SP value in the Table 1 and 2 is $cal^{1/2}cm^{-3/2}$.

TABLE 3

| No. of example | Aqueous polyolefin Type | Aqueous polyolefin Amount (parts) | Block isocyanate Type | Block isocyanate Amount (parts) |
| --- | --- | --- | --- | --- |
| 21 | Example 6 | 100 | A | 100 |
| 22 | Example 11 | " | B | 100 |
| 23 | Example 11 | " | A | 200 |
| 24 | Example 12 | " | B | 120 |
| 25 | Example 12 | " | C | 100 |
| 26 | Example 18 | " | A | 80 |
| Comparative example 8 | Comparative example 1 | 100 | A | 100 |
| Comparative example 9 | Comparative example 3 | " | B | 100 |
| Comparative example 10 | Comparative example 5 | " | B | 200 |
| Comparative example 11 | Comparative example 6 | " | A | 100 |
| Comparative example 12 | Comparative example 7 | " | B | 100 |

In Table 3,
A: Duranate X-1118 (made by Asahi Chemical Industry Co.)
B: Colonate 2507W (made by Nippon Polyurethane Industry Co.)
C: Elastoron BN-44 (made by Dai-ichi Kogyo Seiyaku Co.)

TABLE 4

| No. of example | Storage stability test | Adhesiveness test | Moisture resistance test |
| --- | --- | --- | --- |
| 1 | o | 85/100 | Δ |
| 2 | ⊚ | 92/100 | o |
| 3 | ⊚ | 95/100 | o |
| 4 | o | 100/100 | o |
| 5 | ⊚ | 100/100 | o |
| 6 | ⊚ | 100/100 | o |
| 7 | o | 98/100 | o |
| 8 | o | 100/100 | o |
| 9 | o | 100/100 | ⊚ |
| 10 | o | 100/100 | ⊚ |
| 11 | ⊚ | 100/100 | ⊚ |
| 12 | ⊚ | 100/100 | ⊚ |
| 13 | ⊚ | 100/100 | ⊚ |
| 14 | ⊚ | 100/100 | o |
| 15 | ⊚ | 100/100 | o |
| 16 | o | 100/100 | o |
| 17 | o | 98/100 | o~Δ |
| 18 | o | 100/100 | o |
| 19 | o | 100/100 | o |
| 20 | o | 100/100 | o |
| Comparative example 1 | o | 51/100 | x |
| Comparative example 2 | Δ | 34/100 | x |
| Comparative example 3 | o | 0/100 | xx |
| Comparative example 4 | o | 0/100 | xx |
| Comparative example 5 | o | 43/100 | xx |
| Comparative example 6 | o | 68/100 | Δ |
| Comparative example 7 | o | 75/100 | Δ |

⊚: Very good, o: Good, Δ: Slightly poor, x: Poor, xx: Very poor

TABLE 5

| | Adhesiveness test | Gasoline resistance test | Flexing resistance test | Moisture resistance test | Warm water resistance test |
| --- | --- | --- | --- | --- | --- |
| Example 21 | 100/100 | ⊚ | ⊚ | ⊚ | o |
| Example 22 | 100/100 | ⊚ | ⊚ | ⊚ | ⊚ |
| Example 23 | 100/100 | ⊚ | ⊚ | ⊚ | o |
| Example 24 | 100/100 | ⊚ | ⊚ | ⊚ | ⊚ |
| Example 25 | 100/100 | o | ⊚ | ⊚ | ⊚ |
| Example 26 | 100/100 | o | ⊚ | ⊚ | o |
| Comparative example 8 | 60/100 | x | o | Δ | xx |
| Comparative example 9 | 13/100 | x | o | x | xx |
| Comparative example 10 | 53/100 | Δ | o | Δ | xx |
| Comparative example 11 | 100/100 | Δ | o | o | xx |
| Comparative example 12 | 100/100 | o | o | Δ | x |

⊚: Very good, o: Good, Δ: Slightly poor, x: Poor, xx: Very poor

TABLE 6

| | Storage stability | Adhesiveness | Gasoline resistance | Water resistance | Flexing resistance Room temp. | Flexing resistance -20° C. |
| --- | --- | --- | --- | --- | --- | --- |
| Example 29 | ⊚ | o | o | o | ⊚ | ⊚ |
| Example 30 | ⊚ | o | ⊚ | ⊚ | ⊚ | o |
| Example 31 | ⊚ | ⊚ | ⊚ | o | ⊚ | o |
| Example 32 | o | ⊚ | Δ | o | ⊚ | Δ |
| Example 33 | ⊚ | ⊚ | o | o | ⊚ | o |
| Comparative example 15 | x | ⊚ | Δ | x | o | x |
| Comparative example 16 | xx | ⊚ | Δ | x | o | xx |
| Comparative example 17 | ⊚ | o | o | Δ | ⊚ | Δ |
| Comparative example 18 | ⊚ | o | o | Δ | ⊚ | Δ |

As described above, the inventive aqueous resin compositions have excellent adhesiveness to polyolefin, good storage stability and good flexibility of coated film as well. Yet, they allow to form a more water-resistant coated film over the conventional polyolefinic aqueous resin compositions used polyol or surfactant. This brings about the same effect also in a film-forming system with crosslinking structure introduced. Further, since the aqueous conversion is possible without using aromatic organic solvent at all, they are excellent in the aspects of safety and health and environmental pollution.

What is claimed is:

1. An aqueous polyolefin resin composition comprising: (a) a polyolefin or a modified polyolefin selected from the group consisting of polyolefins which have been modified by graft copolymerization with an unsaturated carboxylic acid, unsaturated carboxylic acid anhydride or mixture thereof, polyolefins which have been modified by graft copolymerization with a reactive monomer having radical polymerizability and mixtures thereof and (b) a of poly(alkylene oxide) compound having a solubility parameter (SP value) of not lower than 7 cal$^{1/2}$·cm$^{-3/2}$ to not higher than 12 cal$^{1/2}$·cm$^{-3/2}$ at a proportion of not less than 0.001 wt. % to not more than 50 wt. % upon aqueous conversion of the polyolefin or modified polyolefin.

2. An aqueous polyolefin resin composition according to claim 1, wherein said modified polyolefin is a mixture of polyolefins which have been modified by graft copolymerization with an unsaturated carboxylic acid, unsaturated carboxylic acid anhydride or mixture thereof and polyolefins which have been modified by graft copolymerization with a reactive monomer having radical polymerizability.

3. An aqueous polyolefin resin composition of claim 1, wherein said polyolefin, modified polyolefin or both have a melt viscosity within a viscosity range of 100 cps to 30000 cps at a temperature range of 60° to 300° C. upon aqueous conversion of the polyolefin or modified polyolefin.

4. An aqueous polyolefin resin composition of claim 1, wherein said poly(alkylene oxide) compound further has an average molecular weight of from 200 to 5000.

5. An aqueous resin composition of claim 1, wherein said poly(alkylene oxide) compound is a polyoxyalkylene diol represented by formula (1):

      HO—[(PO)$_n$/(EO)$_m$]—H        (1)

wherein:
E is —CH$_2$CH$_2$—;
P is

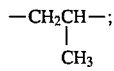
—CH$_2$CH—;
    |
   CH$_3$ n and m are each, independently, an integer of not smaller than 0 to not larger than 100, and wherein $$4 \leq m+N \leq 100$$

and wherein the polyoxyalkylene oxide of formula (1) is a random copolymer or block copolymer, with the exception that when either n or m is 0, the polyoxyalkylene oxide of formula (1) is a homopolymer.

6. An aqueous resin composition of claim 1, wherein said poly(alkylene oxide) compound is an ethylene oxide-propylene oxide adduct of an aliphatic alcohol represented by formula (2):

      RO—[(PO)$_m$/(EO)$_n$]—H        (2)

wherein:
R is a hydrocarbon group having from 1 to 50 carbon atoms;
E is —CH$_2$CH$_2$—;
P is

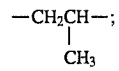
—CH$_2$CH—;
    |
   CH$_3$ m and n are each, independently, an integer of not smaller than 0 to not larger than 50, wherein $$2 \leq m+n \leq 100$$

and wherein the ethylene oxide-propylene oxide adduct of an aliphatic alcohol represented by formula (2) is a random copolymer or block copolymer, with the exception that when either n or m is 0, the ethylene oxide-propylene oxide adduct of an aliphatic alcohol represented by formula (2) is a homopolymer.

7. An aqueous resin composition of claim 1, wherein said poly(alkylene oxide) compound is an ethylene oxide-propylene oxide adduct of an aliphatic amine represented by formula (3):

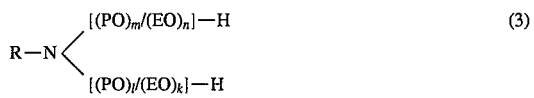

wherein
R is a hydrocarbon group having from 1 to 50 carbon atoms;
E is —CH$_2$CH$_2$—;
P is

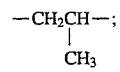
—CH$_2$CH—;
    |
   CH$_3$ m and n are each, independently, an integer of not smaller than 0 to not larger than 50, wherein $$2 \leq m+n \leq 100$$

l and k are each, independently, an integer of not smaller than 0 to not larger than 50, wherein $$2 \leq l+k \leq 100$$

and wherein the ethylene oxide-propylene oxide adduct of an aliphatic amine represented by formula (3) is a random copolymer or block copolymer, with the exception that when either n or m is 0 or when either l or k is 0, the ethylene oxide-propylene oxide adduct of an aliphatic amine represented by formula (3) is a homopolymer.

8. An aqueous polyolefin resin composition of claim 1, further comprising a surfactant ingredient having a structure of polyoxyethylene alkylphenyl ether represented by formula 4)

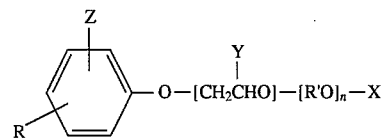

wherein
R is a lower alkyl group;
R$^1$ is —CH$_2$CH$_2$—,

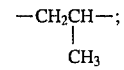
—CH$_2$CH—;
    |
   CH$_3$

X is a hydrogen atom, lower alkyl group or nonionic or anionic hydrophilic group;
Y is a hydrogen atom or —CH$_2$—O—CH$_2$—CH=CH$_2$;

Z is a hydrogen atom or —CH=CH—CH$_3$;

with the exception that Y and Z cannot both contain a double bond;

wherein said surfactant is present in a proportion of from 1:200 to 200:1 with respect to said poly(alkylene oxide) compound.

9. A film former composition useful as paint, primer, ink and coating material, sealant or adhesive containing an aqueous polyolefin resin composition as defined in claim 1.

10. An aqueous polyolefin resin composition according to claim 1, produced by a process comprising the steps that, after melting a raw material resin at an applied pressure of 0.1 to 100 kg/cm$^2$ and mixing in a surfactant or alcohols and a basic substance, water is added gradually under stirring to cause phase inversion, thereby performing aqueous conversion while maintaining the mixture within a range of not lower than 100° C. to not higher than 300° C. upon aqueous conversion of polyolefin and/or modified polyolefin.

11. An aqueous resin composition according to claim 1, further comprising a block isocyanate in a ratio by weight of blocked isocyanate to polyolefin and/or modified polyolefin of 0.1:1 to 20:1, which is added during aqueous conversion or after aqueous conversion.

12. A one-component aqueous polyolefin resin composition comprising formulating an aqueous block isocyanate with aqueous conversion already performed by some method to the aqueous polyolefin resin composition of claim 1 at a proportion by weight of 0.1:1 to 20:1.

13. A two-component aqueous resin composition comprising formulating a block isocyanate with an aqueous conversion performed to the aqueous polyolefin resin composition of claim 1 at the time of painting.

14. The aqueous resin composition of any one of claims 11, 12 or 13, wherein the block isocyanate is a polyisocyanate prepared from hexamethylene diisocyanate.

15. Film formers selected from the group consisting of paints, primers, inks, coating materials, sealants and adhesives, comprising a two-component aqueous resin composition as defined in claim 13.

* * * * *